United States Patent

[11] 3,574,265

| [72] | Inventor | Alfred M. Gibbons<br>Amarillo, Tex. |
|---|---|---|
| [21] | Appl. No. | 787,487 |
| [22] | Filed | Dec. 27, 1968 |
| [45] | Patented | Apr. 13, 1971 |
| [73] | Assignee | Holiday Products, Inc. |

[54] FISH LURE WITH PROJECTABLE HOOK ASSEMBLY
5 Claims, 8 Drawing Figs.

| [52] | U.S. Cl. | 43/35 |
|---|---|---|
| [51] | Int. Cl. | A01k 83/02 |
| [50] | Field of Search | 43/35 |

[56] References Cited
UNITED STATES PATENTS

| 945,091 | 1/1910 | Hanel | 43/35 |
|---|---|---|---|
| 2,041,634 | 5/1936 | Boyko | 43/35X |
| 2,517,844 | 8/1950 | Cooney | 43/35 |

Primary Examiner—Samuel Koren
Assistant Examiner—Daniel J. Leach
Attorneys—Clarence A. O'Brien and Harvey B. Jacobson ABSTRACT: A fishing lure characterized by an attractive plastic or an equivalent plug having a blunt-nose leading end, a median body portion, and a conical rearwardly and outwardly flaring tail portion. The constructed plug has an axial bore which houses a spring-loaded projectable and retractable plunger and fishhook assembly. When cocked and in a position close up to the tail, the fishhook is rendered substantially weedless. When the fish takes the plug and squeezes in on the spring wire triggers, the triggers function to impart rotation to a detent-equipped latching and releasing collar, whereupon the spring-loaded plunger is released and sets the prongs of the hook in the mouth of the fish.

PATENTED APR 13 1971

Alfred M. Gibbons
INVENTOR.

BY *Clarence A. O'Brien*
*and Harvey B. Jacobson*
Attorneys

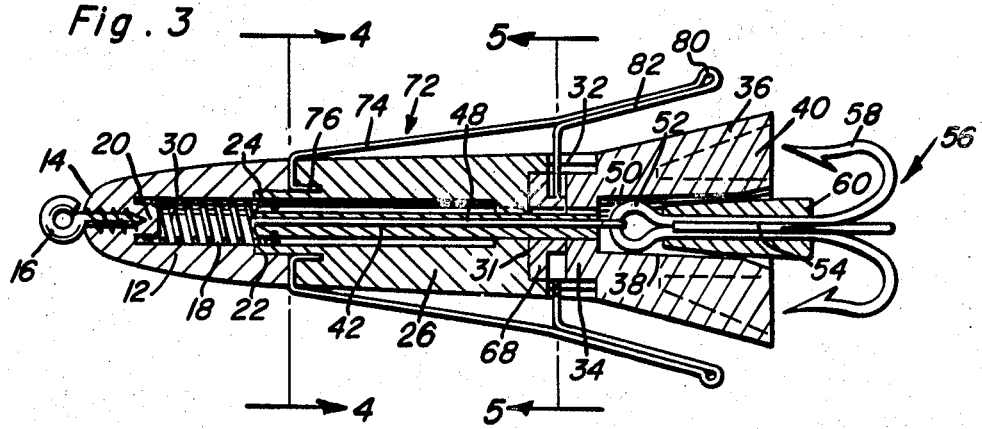
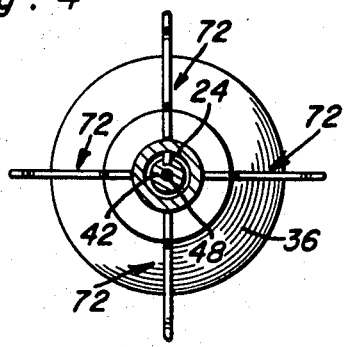
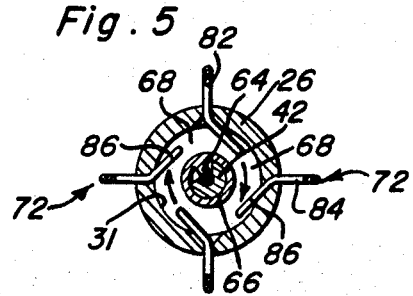
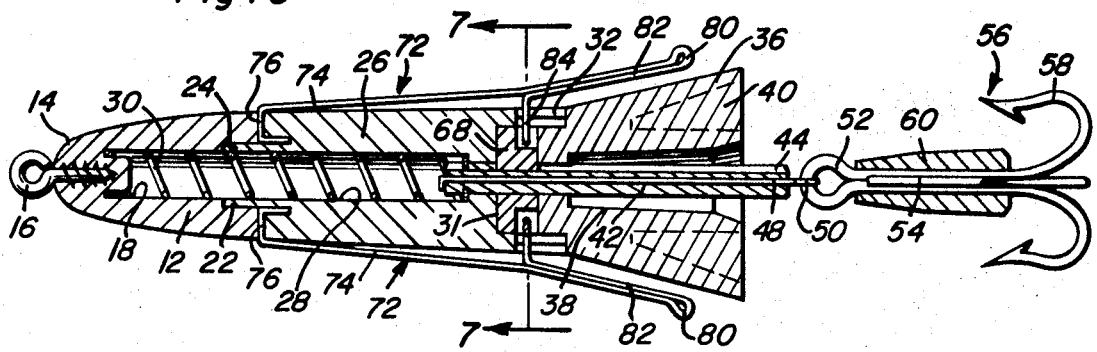
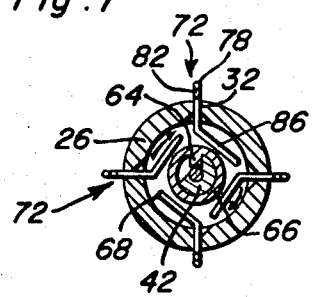

3,574,265

FISH LURE WITH PROJECTABLE HOOK ASSEMBLY

This invention relates to plug-type fishing lures wherein a colorfully attractive plug is provided at its trailing or tail end with bite-responsive, hook-equipped plunger means, more particularly, a spring-loaded sliding plunger having a multiple-pronged fishhook which, when the plunger is retracted, latched and cocked, the prongs of the fishhook are amply close to the terminal of the tail portion that the overall lure is virtually weedless and effectually reliable.

Persons conversant with the artificial fish lure art are aware that the field of endeavor herein which has to do with pull-actuated and bite-responsive trap hooks, justifies the background statement here that it is old in the art to employ a spring-biased hook and plunger assembly which is such in construction and adaptability that it is retained in a retracted or cocked position by rotatable latch means. For example, and if so desired, the reader may desire to take into account a typical reference patent Emil Boyko, U.S. Pat. No. 2,041,634. In the Boyko patent, the disc is rotated by a plurality of circumferentially spaced arms which are pivotally interconnected with the disc in such a manner that when the arms are squeezed or displaced inwardly, the disc is rotated into a position to release the hook assembly and to facilitate setting the hook in the mouth of the fish.

It is an object in the instant matter to improve upon the Boyko trap-hook patent and other generally analogous patents which could be but are not herein cited for background purposes. Accordingly, and, generally stated, it is an object of the present invention to provide a uniquely constructed three-part or equivalent multipart fishing plug which is characterized by a novel retractable and projectable plunger and hook assembly and, more explicitly, by the radially expansible and contractable spring arms which surround the plug in balanced relationship and which when squeezed toward the plug serve to trip and release the projectable hook-equipped plunger.

Briefly, the weedless-type fishing lure herein disclosed has to do with an elongated moldable plastic or an equivalent colorful and attractive plug which, while susceptible of being made in a form other than that shown and described is usually and preferably made up of forward and rearward component portions or sections which are axially aligned with each other and whose inner ends abut the coacting opposite end portions of an intervening complemental body portion. This plug, construed as a structural entity, has an axially disposed bore which is closed at a forward end and is open and opens at its rearward end through the corresponding rear or tail end of the plug. This bore constitutes a suitable socket for the means which is cooperable therewith, more specifically, a retractable and projectable plunger rod. This rod is of requisite cross section and length and is slidingly reciprocable in the accommodating bore. An expansible and contractable coil spring is lodged and confined in a forward end portion of the bore and has a forward end abutting the closed or forward end of the bore and also has a rearward end which has end-thrust connection with the coacting forward end of the plunger rod, that is, when the plunger is in its retracted or cocked position. The assembly also includes a fishhook having a shank and a plurality of prongs or hooks and wherein the shank is pivotally operatively connected to a rearward eye on the rearward end of the plunger rod. The barbed bill portions of the one-piece fishhook are proximal to a rear terminal end surface of the rearward component or tail portion, that is, when the fishhook is in its closeup set and protectively guarded position. A novel latch collar is mounted for limited angular rotation on the relatively slidable but nonrotatable plunger. This collar is confined and pocketed for minimal rotation to the left and right in a recess provided therefore in the body portion of the lure. A plurality of accessible pressure-responsive trigger arms encircle the plug at equidistant circumferentially spaced points. These arms have resilient portions and have like forward ends which are hooked and anchored on a cooperating portion of the plug. The free trippable ends of the arms normally spring outwardly from the adjacent exterior surfaces of the plug. The rearward ends are automatically sprung outwardly by the self-contained or inherent spring properties of the arms and have push-pull, collar-actuating fingers which are suitably shaped and oblique angled and are connected to and serve to rotate the turnable latch collar. The collar has a plunger-setting detent and the plunger rod has a shouldered offset keeper notch or seat with which the detent is releasably engageable. Accordingly, when the fish trips the trigger arms the spring-projected plunger is released and the fishhook is automatically brought into play to set the bills of the prongs or hooks in a manner to catch the fish.

These together with other objects and advantages which will become subsequently apparent reside in the details of construction and operation as more fully hereinafter described and claimed, reference being had to the accompanying drawings forming a part hereof, wherein like numeral refer to like parts throughout, and in which:

FIG. 3 is a central longitudinal sectional view taken through the lure shown in FIG. 1.

FIG. 4 is an enlarged cross section taken approximately on the plane of the section line 4—4 of FIG. 3 looking in the direction of the arrows.

FIG. 5 is a similar cross-sectional view but taken and looking forwardly on the section line 5—5 of FIG. 3.

FIG. 6 is a central longitudinal sectional view based on FIG. 2 and showing the spring expanded, the plunger projected and the fishhook also projected beyond the trailing or tail end of the lure.

FIG. 7 is a cross section taken approximately on the plane of the section line 7—7 of FIG. 6 and which shows the relationship of the component parts when the trigger arms have been collapsed.

Figure 1:
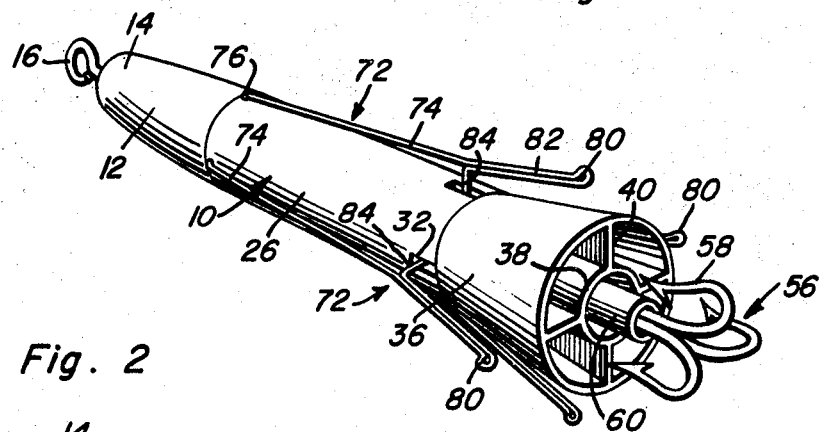
FIG. 1 is a view in perspective of a fish lure with projectable and retractable hook and plunger assembly means constructed in accordance with the principles of the invention and showing the fishhook and component parts latched in place with the plunger rod (not detailed) set and readied for use.

With reference now to the views of the drawing and as should be evident to the reader, it is within the purview of the concept to construct the elongated plug of suitable component parts made of appropriate material. Experience has shown however that whether the "plug" is of one-piece construction or made up of several component parts, it is characterized, broadly stated, by forward, rearward and intervening component parts or sections.

To the end desired and as experience has shown the overall plug is denoted by the numeral 10. It comprises a forward or leading end portion 12 having a rounded blunt nose 14 axially provided with a screw eye 16 to accommodate spinner means (not shown).

Figure 2:
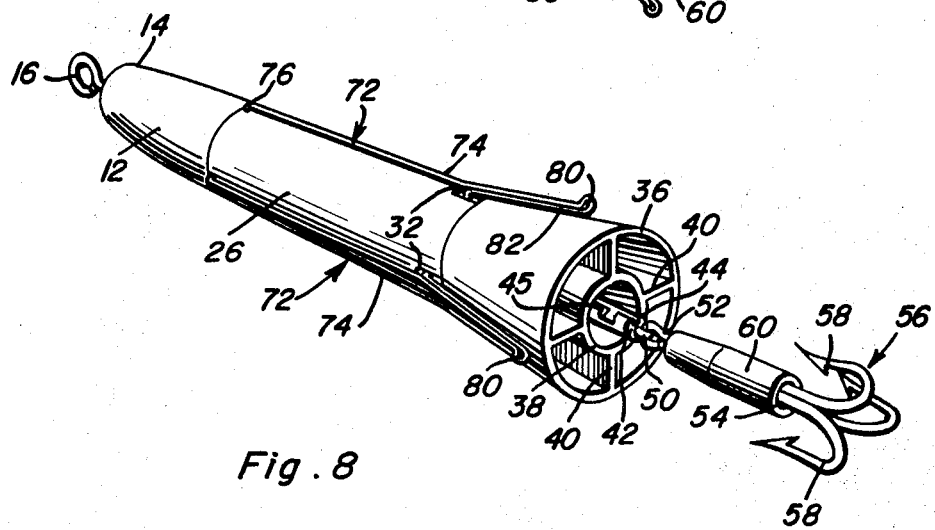
FIG. 2 is a view in perspective similar to FIG. 1 and showing the rearward end of the plunger rod exposed and also with the fishhook means freed and readied to make the catch.

The overall plug is provided with an axial bore which is closed at the forward end and has an open rearward end which opens through the trailing or tail end of the plug, as is brought out particularly well in FIGS. 3 and 6. Actually "the bore" is made up of several component portions, for example, the forward portion 18 which is closed at the forward end as at 20. The counterbored rearward end 22 of portion 12 accommodates a reduced assembling neck 24 provided on the left hand or axial portion of the central part which is here referred to either as a body section or body portion 26. The body portion 26 increases gradually in cross section from the forward toward the rearward end. The bore in this part is denoted at 28 and constitutes a coacting part of the overall lengthwise bore. The portion 18 of the bore serves to accommodate a coil spring 30 which is completely housed therein when the spring is compressed in readiness to expand, as brought out in FIG. 3. Both portions 18 and 28 of the bore serve to accommodate the coil spring when it has expanded to assume the position shown in FIG. 6. The right-hand end portion of the body 26 is provided with a recess 31 which serves in a manner to be later described. This right-hand end portion is also provided in circumferentially spaced points with openings 32 which function in a manner to be described. The right-hand end portion of the body also serves to accommodate a reduced extension 34 on the conical rearwardly and outwardly flaring rearward or tail sections 36. This trailing end portion or tail is also provided with an axial bore which is aligned with and constitutes a component of the overall bore, this portion being conveniently denoted by the numeral 38 in FIG. 3, for example. With further reference to the rearward or tail portion it will be seen that the enlarged end is provided with circumferentially spaced equidistant webs 40 which appear best in FIGS. 1 and 2. It follows that the overall plug is properly and attractively shaped and is made of colorful moldable plastic material with several component parts 12, 26 and 36 interconnected in end-to-end alignment. The several portions of the bore coact in providing a longitudinal bore closed at its forward end and open at the rearward end.

Figure 8:
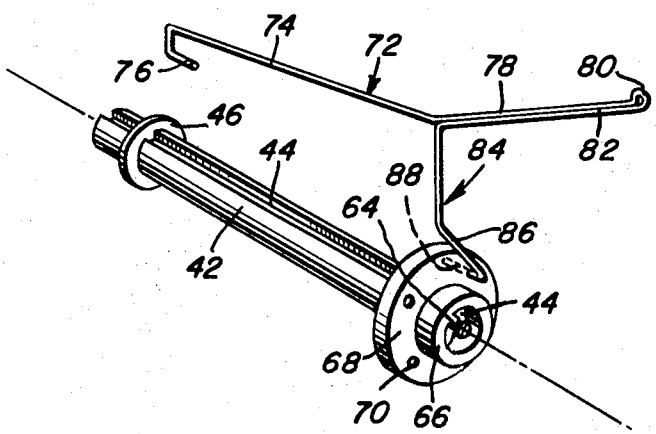
FIG. 8 is a view in perspective showing the longitudinally grooved plunger rod (by itself), one of the springy wire trigger arms, and how the push-pull actuating finger is constructed and turns the latch collar.

In addition to the aforementioned spring 30, the plunger and hook assembly means comprises an elongated rigid plunger rod 42 which is effectually shown in FIG. 8 and whose peripheral surface is provided with an open-ended channel or groove 44 which is sometimes herein referred to as a keyway. This grooved plunger rod is reciprocable or slidable in the bore and when in position shown in FIGS. 3 and 6 in particular it is cooperable with the biasing spring which makes the plunger spring loaded. On the left-hand end portion there is a suitably constructed and fixed stop washer 46 which maintains the plunger against displacement when in the projected position shown in FIG. 6. A reinforcing wire or rod 48 extends through and is a component part of the plunger rod 42. One end of the wire is suitably fixed in place as shown in FIGS. 3 and 6 by laterally bending the end of said wire. The other end portion projects beyond the open end of the groove where it terminates in an eye 50 to accommodate a companion eye 52 on the shank 54 of a multiple-pronged fishhook 56. The barbed or bill-equipped hooks are denoted at 58. A guiding and reinforcing sleeve, which is sufficiently stout, is shown at 60 and is mounted on the shank 54 between the eye and hook. This sleeve can telescope into the right-hand end portion of the bore 38 when the plunger and hook means is cocked or set in readiness to function. With further reference to the surface of the plunger it will be noted that to one side of the groove 44 the surface is provided with a notch 45 which serves as a keeper seat. The keeper seat serves to accommodate a detent or lug 64. More specifically, it should be explained that the lug is carried by a hublike neck 66 which in turn is an integral central part of a washerlike member which is here specifically referred to as a latching collar 68 (FIG. 8). This collar is rotatable in recess means provided therefore, as shown at 31, for example, in FIGS. 3 and 6. The collar is also rotatable from right to left and vice versa on the end portion of the plunger rod which it surrounds. The collar is provided with circumferentially spaced sockets 70 which serve a purpose to be described.

In order to rotate or turn this latching collar novel bite-responsive means is employed. This means is made up of four equidistant circumferentially spaced trigger arms, each of which is denoted by the numeral 72. All of the arms are the same in construction and the description of one will suffice for all. Each arm is constructed as shown, for example, in FIG. 8 and comprises a length of springy wire which has a straight portion 74 and has a hook 76 at the left-hand end which is anchored in place over the end portion of the body portion 26, as brought out in FIGS. 3 and 6. The rearward portion 78 has a return bend as at 80 and this is fashioned into a return bent portion 82 which in turn is provided with a lateral portion which is here referred to as a push-pull finger 84. The finger is provided with an oblique-angled end portion 86 which in turn has a laterally bent terminal 88 which is fitted into one of the aforementioned sockets 70. The inherent spring tension of the bite-responsive arms 72 is such that the arms tend to spring outwardly to the expanded or cocked state shown in FIG. 3. By catching hold of the hook means 56 with the right hand and forcing it from right to left the plunger rod and hook means together are pressed in against the expansive retention of the coil spring 30. When the plunger rod 42 reaches a given or predetermined point the spring-biased fingers 84 come into play in a manner to rotate the collar 68 in a counterclockwise direction with the fingers expanded outwardly and with the aforementioned detent or lug 64 sprung into the shouldered keeper seat or notch 45. As before stated, this notch is considered as a companion part of the adjacent groove. When the detent is in the notch the plunger is set or cocked. At this time, when the fish takes the bait and exerts squeezing pressure on the arms oblique-angled end portions 86 rotate the collar clockwise to release lug 64 from keeper seat or notch 45 so that the plunger 42 is sprung from the bore. Thus, the device can be set and cocked as shown in FIG. 3 in readiness to make the catch. Then, when the trigger arms are sprung by pressure the spring-loaded plunger means is acted upon and the hook means 56 is projected from the weed-guard position in FIG. 3 to the ready-to-catch position shown in FIG. 6.

A fishing lure constructed as herein shown and described has been produced and actually used and has repeatedly shown that it well serves the purposes for which it has been devised and used.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. A weedless-type fishing lure comprising an elongated plug embodying a body portion disposed between forward and rearward component portions with said portions axially aligned with each other, said plug having an axially disposed bore, closed at a forward end and open at its rearward end through the rear end of said plug, a retractable and projectable fishhooking assembly embodying a plunger slidingly reciprocable in said bore, an expansible and contractable coil spring lodged and confined in a forward end portion of said bore and having a forward end abutting the closed forward end of said bore and a rearward end having end-thrust connection with the forward end of the plunger when the plunger is in its retracted cocked position, a fishhook having a shank and a plurality of barbed bill portions pivotally operatively connected to a rearward end of said plunger, the said barbed bill portions of the fishhook being proximal to a rear terminal surface of said rearward component portion when the fishhook is in its closeup set and guarded position, a latch collar mounted for limited angular rotation on said plunger and confined for rotation in a recess provided therefore in said body portion, a plurality of accessible pressure-responsive trigger arms, said trigger arms extending longitudinally and being circumferentially spaced relative to the outer surface of said plug, said arms being resilient and having like forward ends circumferentially spaced and anchored on said plug and free trippable rearward ends normally springable from adjacent exterior surfaces of said plug, said rearward ends being automatically sprung outwardly by the inherent spring properties of said arms and having push-pull collar-actuating fingers connected to said latch collar and for rotating said latch collar, said collar having a plunger-setting detent, and said plunger having a shouldered keeper seat with which said detent is releasably engageable, whereby when the fish trips the trigger arms the spring-projected plunger is released and the fishhook automatically comes into play to set the hook and catch the fish, each arm comprising a single length of springy wire, the springy rearward end of said wire being provided with a return bend and the latter having a free terminal portion extending through an opening in the body portion and being laterally angularly offset and operatively eccentrically connected with a rearward surface of the latch collar in a manner to provide the aforementioned push-pull finger.

2. The fishing lure defined in and according to claim 1, and wherein said forward and rearward component portions and said body portion are separate and independent sections which are arranged in end-to-end relationship and have structurally reduced neck and socket portions which are coaxially aligned and telescopingly joined together, said forward component being blunt nosed and provided with an axially attached eye screw for attachment of a spinner, said rearward component being conical in shape and flared outwardly and rearwardly and having circumferentially spaced internal radial webs defining open-ended pockets.

3. A weedless-type fishing lure comprising an elongated plug characterized by a forward portion, a rearward portion and a centralized body portion, said plug having an axially disposed bore closed at its forward end and opening at its rearward end through a corresponding rearward end of said plug, a retractable and projectable fishhooking assembly comprising an elongated plunger rod slidingly and guidingly mounted in said bore, said rod having a straight groove formed lengthwise in a peripheral surface and providing a longitudinal keyway, said peripheral surface also having a notch formed therein, said notch being disposed at right angles to the lengthwise dimension of said groove with one end aligned and registering with the groove and the other end offset and providing a shouldered keeper seat, and expansible and contractable coil spring lodged and confined in a forward end portion of said bore and having a forward end jammed against a coacting portion of the closed forward end of said bore and a rearward end having end-thrust connection with a forward coacting end of said plunger rod, a multiple-pronged fishhook located rearwardly of an opposed rearward end of the rearward portion of said plug and having a shank pivotally and operatively connected to a rearward end of said plunger rod, a latching collar surrounding and rotatable on said plunger rod and mounted for limited angular rotation in a confining and pocketing recess provided in the body portion of said plug, said collar having an axial hublike neck and the inner peripheral surface of said neck having a radial inwardly projecting lug, said detent providing a plunger cocking and releasing keeper and being alignable with and projecting into the groove in a manner to allow the plunger rod to slide freely inward or outward, said detent when temporarily rotated and projected into said keeper seat serving to cock and retain the plunger rod in a cocked but ready-to-act position, and a plurality of exteriorly accessible bite-responsive trigger arms, said arms extending longitudinally and being circumferentially spaced on the outer surface of said plug, said arms being flexible and resilient and having like forward ends circumferentially spaced and secured on an adjacent portion of said plug and free trippable rearward ends normally sprung radially outward from the encompassed exterior surfaces of said plug, said rearward ends being laterally inwardly bent and providing simultaneously functioning push-pull fingers, said fingers passing through openings provided therefore in said body portion and having oblique-angled ends terminally operatively joined to c circumferentially-spaced portions of said collar and serving to rotate the collar in a manner to control the retaining and releasing positions of said plunger rod.

4. The lure defined in and according to claim 3, and wherein each arm comprises a length of flexible springy wire, the forward end of said wire being laterally bent and fashioned into a hook, said hook being anchored in place on an end portion of the body component.

5. The lure defined in and according to claim 3, and wherein each arm comprises a single length of springy wire, the springy rearward end of said wire being provided with a return bend and the latter having a free terminal portion extending through an opening in the body portion and being laterally angularly offset and operatively eccentrically connected with a rearward surface of the latch collar in a manner to provide the aforementioned push-pull finger.